United States Patent
Arimura et al.

[15] 3,663,863
[45] May 16, 1972

[54] OVERCURRENT PROTECTOR

[72] Inventors: Ichiro Arimura, Kyoto; Hiroshi Goto, Oaza-Hoshida; Hiroshi Matsushima, Osaka; Yoshikazu Nakao, Hirakata, all of Japan

[73] Assignee: Matsushita Electric Ind., Co. Ltd., Kadoma City, Osaka Prefecture, Japan

[22] Filed: Oct. 8, 1970

[21] Appl. No.: 79,220

[30] Foreign Application Priority Data

Oct. 8, 1969 Japan...............44/80942
 Oct. 14, 1969 Japan...............44/82453
 Oct. 8, 1969 Japan...............44/96555

[52] U.S. Cl. ................................317/22, 317/33 SC
[51] Int. Cl. ...............................................H02h 3/08
[58] Field of Search............................317/22, 33 SC

[56] References Cited

UNITED STATES PATENTS

| | | | |
|---|---|---|---|
| 3,311,787 | 3/1967 | Gunderman | 317/22 X |
| 3,373,341 | 3/1968 | Wattson | 317/22 X |
| 3,386,005 | 5/1968 | Roland et al. | 317/22 |
| 3,573,553 | 4/1971 | Mietz et al. | 317/22 |

*Primary Examiner*—James D. Trammell
*Attorney*—Craig, Antonelli & Hill

[57] ABSTRACT

An overcurrent protector including a thyristor which detects an overcurrent condition in a load and turns on, thereby making a current-controlling transistor cut off in order to protect the load from said overcurrent. The improvement lies in the provision of a switching element connected to the thyristor, which, upon elimination of the overcurrent condition, automatically functions to turn off the thyristor without any manual operation.

10 Claims, 4 Drawing Figures

Patented May 16, 1972

3,663,863

INVENTORS
ICHIRO ARIMURA, HIROSHI GOTO,
BY HIROSHI MATSUSHIMA AND
YOSHIKAZU NAKAO
Craig, Antonelli, Stewart & Hill
ATTORNEYS

OVERCURRENT PROTECTOR

This invention relates to an improvement in an overcurrent protector, especially in an overcurrent protector of the type wherein a current-controlling transistor is automatically restored to the conductive state after elimination of the overcurrent condition.

The current-limiting type protector has been widely used for protecting constant-voltage power sources of comparatively small current rating. However, in an overcurrent protector for a large current power source, use of such current-limiting type protector is undesirable, since under the flow of large current, particularly during a short circuit of the load for a long time, the collector dissipation of the current-limiting transistor therein may prominently increase, resulting in heat damage to the transistor. Accordingly, for protecting a large current constant-voltage power source, it is preferable to employ a circuit of the type having a switching device that causes the current-controlling transistor to be cut off upon generation of an overcurrent. As such a switching device, a thyristor is preferable on account of the simplicity of the resulting circuit. When a thyristor is employed as such a switching device, in order to restore the thyristor to the cut-off state after generation and then extinction of an overcurrent, it is necessary to take specific measures for turning off the thyristor by, for instance, effecting a shortcircuiting between the anode and the cathode of the thyristor or by cutting off the circuit of the anode or the cathode so as to stop the current flow through the thyristor.

Conventionally, such measures are effected by manual switching after each turn-on of the thyristor.

Manual operation of the switch for restoring the overcurrent protector to the normal state is inconvenient, and therefore, the primary object of the present invention is to obtain an improved overcurrent protector having a thyristor for detecting an overcurrent condition and for cutting-off the current-controlling transistor in response thereto, wherein said thyristor can be automatically made to turn off by function of a switching element responsive to the current condition of the load.

Another object of the present invention is to obtain an improved overcurrent protector having a thyristor for detecting an overcurrent condition and for cutting-off the current-controlling transistor, wherein said thyristor can be automatically made to turn off by means of an input signal to an amplifier connected to the output terminals of the overcurrent protector.

Further objects and advantages will be best understood from the following detailed description when read in conjunction with the accompanying drawing, in which.

Figure 4:
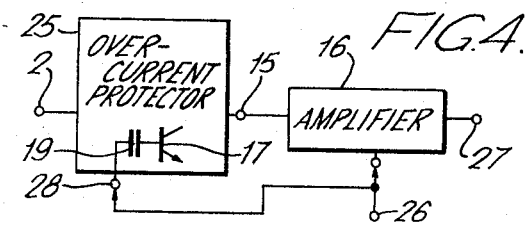
Figure 3:
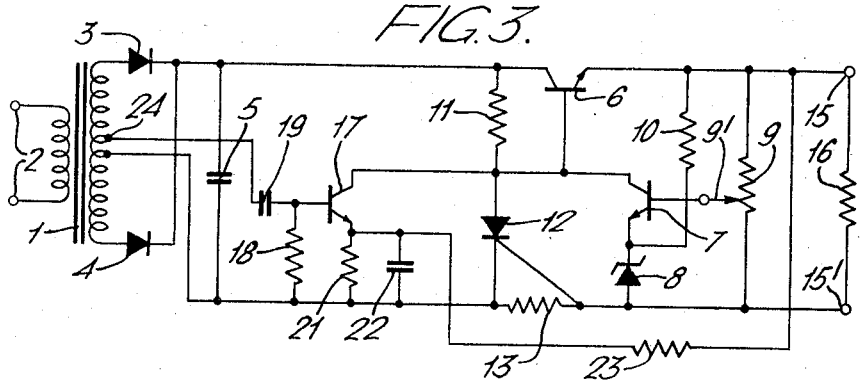

FIG. 3 is a circuit diagram of a modified example of the overcurrent protector embodying the present invention, wherein commercial power is employed as the restoring signal; and FIG. 4 is a circuit diagram of another modified example of the overcurrent protector embodying the present invention, wherein an input signal to an amplifier connected to the overcurrent protector as a load is employed as a restoring signal.

Figure 1:
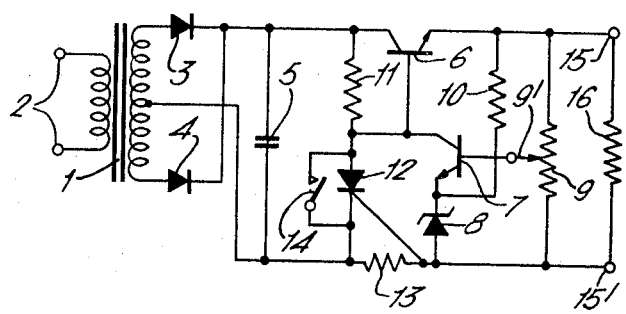
FIG. 1 is a circuit diagram of a conventional constant-voltage type overcurrent protector having a manual restoring means.

In FIG. 1, showing an example of a conventional constant-voltage type overcurrent protector, terminals 2 of a primary coil of a power transformer 1 are connected to a commercial power source (not shown), both end terminals of a secondary coil are connected in common to the positive terminal of a smoothing capacitor 5 through respective rectifying diodes 3 and 4, and the center tap of the secondary coil is connected to the negative terminal of the smoothing capacitor 5. The emitter electrode and collector electrode of a current-controlling transistor 6 are connected in series to said positive side of the capacitor and the positive output terminal 15, and the base electrode of the current-controlling transistor 6 is connected to the collector electrode of a voltage-detecting transistor 7, whose emitter electrode is connected to the negative output terminal 15' through a Zener diode 8 and whose base electrode is connected to a dividing terminal 9' of the potentiometer 9 connected between the positive output terminal 15 and the negative output terminal 15'. A resistor 10 is connected between the positive output terminal 15 and the positive terminal of the Zener diode 8. The load resistor 11 for the voltage-detecting transistor 7 is connected between the positive terminal of the capacitor 5 and the collector electrode of the transistor 7. The positive electrode of a thyristor 12 is connected to the negative terminal of the capacitor 5, the control electrode of the thyristor 12 is connected to the negative output terminal 15', and an overcurrent-detecting resistor 13 is connected between said negative electrode and the control electrode of the thyristor 12. A manual restoring switch 14 is connected between the positive electrode and the negative electrode of the thyristor 12.

The above-mentioned conventional overcurrent protector operates as follows:

When an overcurrent flows into a load 16 connected to the output terminals 15 and 15', the voltage drop across the overcurrent-detecting resistor 13 reaches a substantial level, thereby turning the thyristor 12 on by imparting a triggering signal to the control gate thereof. Upon turn-on of the thyristor, the current flowing through the resistor 11 to the transistor 7 diminishes, since the thyristor 12 short-circuits the transistor 7. As a consequence of the base electrode of the current-controlling transistor 6 being grounded by the above-mentioned turn-on of the thyristor 12, said transistor 6 is instantly cut off, thereby protecting load 16 and the transistor 6 itself. Due to its nature, the thyristor 12 remains turned on until the restoring switch 14 is closed to short-circuit the positive electrode and the negative electrode thereof.

As described above, the conventional overcurrent protector requires its restoring switch to be closed in order to restore it to the normal state from the cut-off state for the load current.

Figure 2:
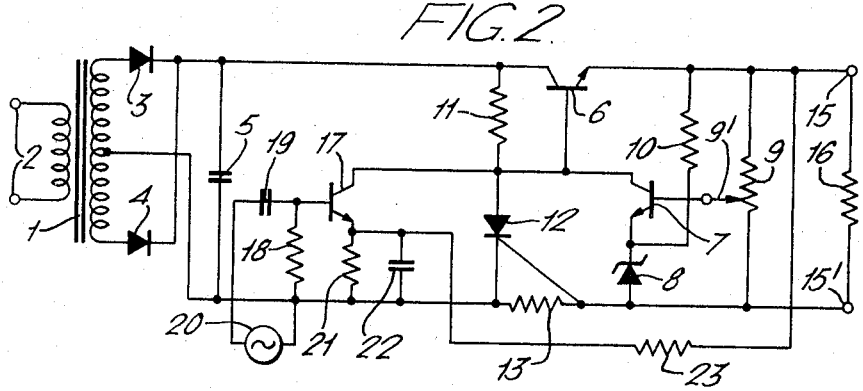
FIG. 2 is a circuit diagram of a basic example of the overcurrent protector embodying the present invention.

In FIG. 2, showing the basic example of the present invention, terminals 2 of a primary coil of a power transformer 1 are connected to the commercial power source (not shown); both end terminals of a secondary coil are connected in common to the positive terminal of the smoothing capacitor 5 through the rectifying diodes 3 and 4, respectively; and the center tap of the secondary coil is connected to the negative terminal of the smoothing capacitor 5. The emitter electrode and collector electrode of a current-controlling transistor 6 are connected to said positive side of the capacitor and the positive output terminal 15, respectively; and, the basic electrode of the current-controlling transistor 6 is connected to the collector electrode of a voltage-detecting transistor 7, whose emitter electrode is connected to the negative output terminal 15' through a Zener diode 8, and whose base electrode is connected to a dividing terminal 9' of the potentiometer connected between the positive output terminal 15 and the negative output terminal 15'. A resistor 10 is connected between the positive output terminal 15 and the positive terminal of the Zener diode 8. A load resistor 11 of the voltage-detecting transistor 7 is connected between the positive terminal of the capacitor 5 and the collector electrode of the transistor 7. The positive electrode of a thyristor 12 is connected to the base electrode of the current-controlling transistor 6; the negative electrode of the thyristor 12 is connected to the negative terminal of the capacitor 5; the control electrode of the thyristor 12 is connected to the negative output terminal 15'; and an overcurrent-detecting resistor 13 is connected between said negative electrode and the control electrode of the thyristor 12.

In this example, a switching transistor 17 is provided by connecting its collector electrode to the positive terminal of the thyristor 12 and connecting its emitter electrode to the negative terminal of the thyristor 12 through the resistor 21. A by-pass capacitor 22 is connected in parallel with the resistor 21, and a resistor 23 is connected between the emitter electrode of the switching transistor 17 and the positive output terminal 15. A resistor 18 is connected between the base electrode of the switching transistor 17 and the negative electrode of the thyristor 12, and an a.c. signal source 20, such as an oscillator, is connected across the resistor 18 through a capacitor 19.

The above-mentioned example of the present invention operates as follows:

In the normal state where load current is within a predetermined allowable value, the a.c. output signal from the a.c. signal source 20 does not make the switching transistor 17 conductive, since the d.c. bias-voltage imparted to the emitter electrode of said transistor 17 through resistors 23 and 21 is pre-set to exceed the peak voltage of said a.c. output signal.

When an overcurrent flows into a load 16 connected to the output terminals 15 and 15', the voltage drop across the overcurrent-detecting resistor 13 reaches a substantial level, thereby turning the thyristor 12 on by imparting a triggering signal to the control gate thereof. Upon turn-on of the thyristor, the current flowing through the resistor 11 to the transistor 7 diminishes, since the thyristor 12 short-circuits the transistor 7. As a consequence of the base electrode of the current-controlling transistor 6 being grounded by the above-mentioned turn-on of the thyristor 12, the transistor 6 is instantly cut off, thereby protecting load 16 and the transistor 6 itself. With the current-controlling transistor 6 in the cut-off state, the voltage of the positive output terminal 15 drops to zero and consequently the bias-voltage imparted to the emitter electrode of the switching transistor 17 also drops to zero. As said bias-voltage drops, the a.c. output signal from the a.c. signal source 20 works to make the switching transistor 17 conductive, thereby drastically reducing the collector-emitter resistance of said transistor 17. Since the emitter electrode of said transistor 17 is connected to the negative electrode of the thyristor 12 through the capacitor 22, the thyristor 12 is substantially short-circuit during the transient period right after the conduction of the switching transistor 17, allowing all the current through the resistor 11 to flow through said transistor 17, and thereby turning off the thyristor 12.

When the overcurrent flowing into the load 16 ceases prior to the turning off of the thyristor 12, this turn-off state remains and becomes the restored normal state. However, when the cause of the overcurrent continues after the turn-off of the thyristor 12, the overcurrent flows again and the thyristor 12 is turned on again. Therefore, the thyristor is repeatedly turned on and off at the frequency of the output signal of the a.c. signal source 20, and the substantial load current in the load 16 is minimized to a negligible value.

In FIG. 3, showing a modified example of the present invention, a means for taking out a fraction of commercial power voltage, such as a second tap 24 is connected to the base electrode of the switching transistor 17 through the capacitor 19, instead of using the a.c. signal source 20 as in FIG. 2. Parts other than the second tap 24 are the same as those described in the first example. In the overcurrent protector of this second example, an a.c. signal is imparted from the second tap 24 to the base electrode of the switching transistor 17, to make the switching transistor 17 conductive when the current-controlling transistor 6 is cut off, like in the first example shown in FIG. 2.

As a further modification of the above-mentioned second example, a voltage dividing the resistor network can be employed also as said means for taking out a fraction of commercial power voltage. Of course, an independent third winding in the power transformer 1 can be employed as such means, too.

In FIG. 4, showing a further modified example, the load 16 is an amplifier such as an audio amplifier, and the input terminal 26 of the amplifier 16 is connected to the input terminal 28 of the switching device such as the switching transistor 17 of the overcurrent protector 25, which is constituted in the same circuit as those shown in FIGS. 2 or 3 but excludes the a.c. signal source 20 or the second tap 24.

In this example, an input signal from the input terminal 26 is divided and imparted to the input terminal 28 of the switching transistor 17 of the overcurrent protector 25, in order to make the switching transistor 17 conductive when the bias-voltage of this transistor 17 drops. A random signal, for instance, an audio signal can be used as said signal, since usually there is no need for turning off the thyristor 12 in a determined short time. A limiter circuit for limiting the excessive amplitude of the input signal to the terminal 28 can be effectively used in order to avoid inaccurate working.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An overcurrent protector including a current control transistor for controlling the current flowing from a source to a load, thyristor means including a thyristor which is rendered conductive in response to an overcurrent condition in the load for cutting-off conduction of said current control transistor, and thyristor control means responsive to the cut-off condition of said current control transistor for automatically rendering said thyristor non-conductive, wherein said thyristor control means includes a semi-conductor switching device connected across said thyristor, an a.c. signal source connected to the control input of said switching device and a biasing network connected to said load and said switching device so as to bias said switching device to conduction only while said current control transistor is cut off.

2. An overcurrent protector as defined in claim 1, wherein said a.c. signal source comprises means providing a fraction of commercial voltage.

3. An overcurrent protector as defined in claim 1, wherein said load is provided as an amplifier and said a.c. signal source comprises means for deriving a portion of the input signal of said amplifier.

4. An overcurrent protector as defined in claim 1, wherein said switching device is an emitter-grounded transistor having its base electrode connected to said a.c. signal source, said biasing network including a pair of resistors connected in series across said load, and the emitter electrode of said emitter-grounded transistor being connected through one of said resistors to ground.

5. An overcurrent protector as defined in claim 4, wherein said a.c. signal source comprises means providing a fraction of commercial voltage.

6. An overcurrent protector as defined in claim 4, wherein said load is provided as an amplifier and said a.c. signal source comprises means for deriving a portion of the input signal of said amplifier.

7. An overcurrent protector including a current control transistor for controlling the current flowing from a source to a load, thyristor means including a thyristor which is rendered conductive in response to an overcurrent condition in the load for cutting-off conduction of said current control transistor, and thyristor control means responsive to the cut-off condition of said current control transistor for automatically rendering said thyristor non-conductive, wherein said current control transistor has emitter and collector electrodes connected in series with said load across a power supply, said thyristor means further including the series combination of a resistor and a transistor connected in parallel with the series connected current control transistor and load across said power supply, the base of said current control transistor being connected to the junction between said resistor and transistor of said series combination and said thyristor being connected across the transistor thereof.

8. An overcurrent protector as defined in claim 7, wherein said thyristor control means includes a semi-conductor switching device connected across said thyristor, an a.c. signal source connected to the control input of said switching device and a biasing network connected to said load and said switching device so as to bias said switching device to conduction only while said current control transistor is cut off.

9. An overcurrent protector as defined in claim 8, wherein said switching device is an emitter-grounded transistor having its base electrode connected to said a.c. signal source, said biasing network including a pair of resistors connected in series across said load, and the emitter electrode of said emitter-grounded transistor being connected through one of said resistors to ground.

10. An overcurrent protector as defined in claim 9, wherein said power supply includes a transformer having a primary and a secondary winding, the primary winding being connected to a voltage source, and said a.c. signal source comprising a tap on said secondary winding connected to the base electrode of said switching device.

* * * * *